United States Patent [19]

Zauderer

[11] Patent Number: 4,851,722

[45] Date of Patent: Jul. 25, 1989

[54] MAGNETOHYDRODYNAMIC SYSTEM AND METHOD

[75] Inventor: Bert Zauderer, Merion, Pa.

[73] Assignee: Coal Tech Corp., Merion, Pa.

[21] Appl. No.: 910,953

[22] Filed: Sep. 24, 1986

[51] Int. Cl.⁴ .............................................. H02N 4/02
[52] U.S. Cl. ...................................................... 310/11
[58] Field of Search ............................ 310/304, 10, 11

[56] References Cited

U.S. PATENT DOCUMENTS

| | | | |
|---|---|---|---|
| 3,720,850 | 3/1973 | Way | 310/11 |
| 4,016,438 | 4/1977 | Holt | 310/11 |
| 4,163,910 | 8/1979 | Matthews et al. | 310/11 |
| 4,287,443 | 4/1981 | Aladiev et al. | 310/11 |
| 4,345,173 | 8/1982 | Marchant et al. | 310/11 |
| 4,346,302 | 8/1982 | Bozzuto | 310/11 X |
| 4,354,354 | 10/1982 | Wysk et al. | 310/11 X |
| 4,418,294 | 11/1983 | Rahman | 310/11 |
| 4,645,959 | 2/1987 | Dobran | 310/11 |

Primary Examiner—Mark O. Budd
Attorney, Agent, or Firm—Ratner & Prestia

[57] ABSTRACT

Apparatus and method for non-equilibrium MHD generation including a cyclone combustor, in which particulate metal is oxidized to form non-gaseous by-products. A low molecular weight working gas, such as hydrogen or helium, is energized by mixture thereof in said cyclone generator. Substantially non-gaseous oxidation by-products are removed by cyclonic action from the working fluid. The thus energized working fluid, with its swirling movement neutralized by the introduction of a further portion of working fluid, is then delivered through a nozzle to the MHD generator.

35 Claims, 6 Drawing Sheets

MAGNETOHYDRODYNAMIC SYSTEM AND METHOD

DESCRIPTION OF THE INVENTION

1. Technical Field

The present invention relates, in general, to generating high power with a magneto-hydrodynamic (MHD) generator and, in particular, to a system and method for producing working fluid for a non-equilibrium MHD generator.

2. Background Art

An MHD generator is a device in which a high velocity working fluid is rendered electrically conducting by the injection of an easily ionizable seed material, such as an alkali metal vapor. By Faraday's law of electromagnetic induction, an electric field, orthogonal to the velocity and magnetic field vectors, is induced in the conducting working fluid. The current resulting from this field is collected by electrodes placed on the two opposite channel walls of the generator. At high magnetic fields, the conducting working fluid exhibits a Hall effect which results in an axial electric field, called the Hall field. To prevent the electrodes from shorting the Hall field and sharply reducing the power output, the electrodes are segmented in the axial direction of the generator. Such an electrode configuration is called the "Faraday" mode of operation and requires special electrical circuitry to consolidate the power output from multiple electrode pairs to a smaller number of circuits suitable for practical applications. However, under certain operating conditions which are believed to be attainable with the present invention, the Hall field is small enough that a very small number of electrode pairs can be used, in which case the power consolidation circuits may not be necessary.

With certain working fluids, the electrical conductivity of the working fluid may be enhanced above the equilibrium value for that fluid at a given temperature by the electric fields in the generator. Generators using such working fluids are known as non-equilibrium generators. Generators in which the electrical conductivity of the working fluid is not enhanced are known as equilibrium generators.

The power output per unit volume in an MHD generator is given by:

$$P = \sigma U^2 B^2 K(1-K) \qquad (1)$$

where $\sigma$ is the effective conductivity of the working fluid $\upsilon$ is the velocity of the working fluid B is magnetic field strength K is the load factor maximum power in an equilibrium generator, K=0.5, while in a non-equilibrium generator, power is maximized when K is at about 0.3. High power output densities require high conductivities and high velocities. The latter can be achieved with a low molecular weight gas, such as helium or hydrogen, flowing at supersonic velocities in the generator. Heretofore, there has been no chemical heat source which provides low cost and efficient heating of these low molecular weight gases or any inert gas suitable for a non-equilibrium generator.

MHD generators can be classified according to the working fluid used in the generator. The term "open cycle" MHD generator is generally defined as a device in which the products of combustion, produced for example by a cyclone combustor, are seeded with potassium and used directly as the generator working fluid and then exhausted to the environment. In this case, electrical conductivity is determined by the gas temperature in the generator. The term "closed cycle" MHD generator is generally defined as a device in which a noble gas, seeded with potassium or cesium, is used as the generator working fluid, which is recycled after passage through the MHD channel.

From the foregoing, in an open cycle generator, working fluid is exhausted to the environment, while for a closed cycle generator the working fluid is recycled. However, in pulsed power operation, if the pulse duration is sufficiently short, even costly gases can be used in either an open or closed cycle system regardless of the non-equilibrium effect. For purposes of this patent application, the terms "open cycle" and "closed cycle" are used as applying to a non-equilibrium generator in which the working fluid is exhausted from the generator to the environment or recycled, respectively.

Below about 2,500° K. stagnation temperatures, the electrical conductivity in alkali metal seeded, monatomic or diatomic gases, at the static gas temperatures corresponding to supersonic flow in an MHD generator, is negligible. To render these gases conductive, the induced magnetic field in the generator is used to produce a hot electron working fluid having an electron temperature exceeding the stagnation gas temperature by an amount given by the following equation for an infinitely segmented Faraday generator:

$$\frac{T_e}{T_o} = \frac{1 + \nu(1-K)^2 M^2 \beta^2}{3\delta} \qquad (2)$$

where e and o apply to the electrons and gas stagnation conditions, respectively $\nu$ is the ratio of specific heats $\beta$ is the Hall parameter or ratio of electron cyclotron to collision frequency $\delta$ is an electron energy loss parameter that depends on the type and concentration of molecular impurities M is the Mach number K is the load factor For this ratio to exceed unity, the Hall parameter should be greater than unity and the loss parameter should be near unity. This indicates that non-equilibrium ionization requires the use of noble gases having molecular gas impurity concentrations much below 1% by mol weight. However, at stagnation temperatures above 3,000° K., it should be possible to obtain some non-equilibrium effects in hydrogen due to its low molecular weight and its low value of $\delta$ which varies from 2 to 8 below 11,600° K., (le.v). For typical conditions used in prior experimental Faraday generators, a closed cycle generator using cesium-seeded argon gas at a stagnation temperature of 2,000° K. (obtained with a chemical fuel heat source and heat exchanger) produced enhanced conductivities that were considerably higher than the levels measured in open cycle generators using hydrocarbon combustion gases at a stagnation temperature of 3,000° K. obtained by the combustion of fossil fuels fired with oxygen.

In the present invention, stagnation temperatures up to 6000° K. are believed to be attainable in low molecular weight gases. Therefore, the non-equilibrium conductivities that were heretofore only attainable in seeded noble gases now also are attainable in gases such as hydrogen. Based on analytical and experimental research in non-equilibrium working fluids containing varying amounts of molecular gases, it is estimated that high electrical conductivities can be obtained in a non-equilibrium MHD generator using hydrogen seeded with cesium, at stagnation temperatures above 3000° K. To a first order approximation, the degree of non-equilibrium ionization in hydrogen can be determined from equation (2) with a value of δ between 2 and 8.

By way of illustration, the peak performance that has heretofore been measured with a closed cycle, non-equilibrium MHD generator has been in experiments using shock tubes and shock tunnels to heat the seeded noble gases. These devices were used to enable researchers to overcome the lack of an economical, high thermal power, heat source for the generator working gas. In a supersonic MHD channel, with a 0.04 m³ volume, a 6/1 area ratio, a 1.2 m long axial electrode length, a 2.7 Tesla magnetic field, neon-seeded with 1 to 1.7% cesium, 10 MW thermal input power and a stagnation temperature of 3520° K., non-equilibrium power levels of 1.8 MWe equal to 19.3% enthalpy extraction were measured. At a lower stagnation temperature of 2580° K., the power output decreased to 0.63 MWe, equal to 16.5% enthalpy extraction. The power output densities were about 40 to 50 MWe/m³ of generator volume.

More recently, researchers have used a ceramic storage heat exchanger, similar in design to those used in steel blast furnaces, to heat argon to 1910° K. Cored ceramic bricks in the heat exchanger were heated to 1920° K. by natural gas. After reaching the operating temperature, the gas flow was shut off and the residual combustion products were evacuated from the heat exchanger passages. The argon was then discharged for one minute through the passages and heated to 1910° K. The thermal input power to the argon was 5 MWt. The argon was seeded with cesium and 0.36 MWe, equal to 7.3% enthalpy extraction, power output was measured in the MHD generator.

By comparison, the best performance in open cycle MHD generators has been obtained with combustion gases produced with aluminum particle-containing solid rocket fuels, in which combustion gas temperature of about 4000° K. was attained at 50 to 100 atmospheres in the combustor. Due to the high temperature, only 3 second operation was possible with the heat sink combustor, channel, and magnet design concept used in the experiments. In a 1 m long channel, a 4 Tesla magnetic field, a 1.6 to 1 exit to entrance area ratio, 15 MWe, equal to 12% enthalpy extraction, was measured. The power density was 500 MWe/m³ of channel volume. The high absolute power output clearly showed the benefit of direct use of a combustion gas heat source to an MHD generator.

However, the enthalpy extraction, which measures how much of the fuel energy is converted to electricity, and which is extremely important in producing a compact, pulse power system, was only 12%. This is about one-half of the best enthalpy extraction obtained in non-equilibrium shock tube driven MHD generators. The lower enthalpy extraction in combustion gases is an inherent property of the gas and it is due to low ratio of specific heats in these gases. This can be seen from the following Table I which shows the pressure ratios required for 20% enthalpy extraction in the MHD generator, as a function of ratio of specific heats.

TABLE 1

PRESSURE RATIO REQUIRED FOR 20% ENTHALPY EXTRACTION IN MHD GENERATOR, AS A FUNCTION OF THE GAS SPECIFIC HEAT RATIOS, ν

| ν | = | 1.1 | = | 1.3 | = | 1.67 |
|---|---|---|---|---|---|---|
| N | = | 0.45 | = | 0.38 | = | 0.30 |
| PRESSURE RATIO | = | 200. | = | 12.7 | = | 6.3 |

This pressure ratio is also a function of generator polytropic efficiency, namely turbine efficiency, which is given by:

$$N = \frac{K}{1 + \frac{(\nu - 1)M^2(1 - K)}{2}} \quad (3)$$

where K is the load factor
ν is the ratio of specific heats
M is the Mach number For a typical high power application, a value of K of 0.5 and a Mach number of 2 is used. The specific heat ratio is about 1.1 for hydrocarbon combustion products and with metal fuel additives, the specific heat ratio is about 1.3 for hydrogen and 1.67 for helium. The results in Table I show that hydrocarbon combustion products require an extremely high pressure ratio of 200/1 across the generator. For space based applications, where all the fuel and oxidizer must be carried into space, high enthalpy extraction is critical. Thus, hydrogen and helium, which result in a more realistic pressure ratio in the generator, are preferred for short burst duration, space applications, or for terrestrial applications where total system weight and volume must be limited.

For non-equilibrium MHD generator operation exceeding several seconds, the only suitable chemical heat source to date has been a regenerative ceramic storage heat exchanger, similar to those used in the steel industry. In such a device, the combustion gases and the MHD generator working fluid, namely a noble gas, are alternately cycled throughout the same passages in the heat exchangers. Ceramic materials limit the peak temperature in this device to about 2000° K. One such heat exchanger, rated at 1 million BTU/hr was successfully used to heat argon to 1920° K.

In addition to the low peak temperature limitation, these heat exchangers are too massive to be of use in pulsed MHD systems. Even in continuous MHD systems, where a series of at least four heat exchangers are cycled to produce a continuous hot gas flow, the massive size of these units renders them uneconomical for electric power generation.

The inefficiency of the heat exchanger is shown, by way of example, for a 10 second pulsed power application. Assuming a 1 MWe net MHD generator output, a 30% enthalpy extraction in the non-equilibrium MHD generator, a 2000° K. peak stagnation temperature, and a 10 second operating time, 1.26 million BTU needs to be stored in the ceramic bricks of the heat exchanger. For proper operation of the heat exchanger, the heat storage in the ceramic is about 10 times the heat extraction per pulse. Using alumina ceramic bricks, the weight of the ceramics calculates to 950 kg. In addition, using a 50% void fraction in the heat exchanger for gas passages, a total volume of 0.73 m³ is computed.

Comparing this to the combustion MHD generator with only a 12% enthalpy extraction, which is similar to the best performance reported in open cycle MHD generators using combustion gases produced with solid rocket fuels, only 18 kg of solid rocket fuel, or about 2% of the ceramic weight, are required to produce the same 1 MWe for 10 seconds. Also, the fuel volume is about 0.02 $m^3$ or 2.7% of the ceramic volume.

Additional background art relating to the present invention is an apparatus known as a cyclone coal combustor. This apparatus includes a cylindrical, horizontal device into which pulverized coal is injected with a primary air stream and the coal is centrifuged with secondary air toward the cylindrical wall of the cyclone. As the coal particles burn in suspension and on the wall of the cyclone in the hot oxidizing gas temperature, averaging 1920° K., the ash particles in the coal melt and are thrown to the wall. This liquid ash, called slag, rapidly coats the inner wall and it is continuously drained by the action of gravity toward the bottom and downstream end of the cyclone, where it is removed through a port, known as the slag tap. An advanced version of a cyclone coal combustor is disclosed and claimed in applicant's copending application Ser. No. 681,875, filed Dec. 11, 1984.

Additional background art relating to the present invention is research on the combustion of ensembles of metal particles, such as aluminum, magnesium, boron, in an oxidizing gas, and the application of this technology to combustion chambers for rockets, ramjets, and gas turbines. The motivation for this work has been the high heat of combustion of metals, especially boron, which allows significant weight reductions in aircraft or missiles. Unlike the present invention, the emphasis in metal combustion research for propulsion has been on exhausting the metal oxide products of combustion from the combustion chamber in a gaseous form and on developing means for recovering the heat of condensation of the metal oxide vapors during the expansion process in the rocket or ramjet exhaust nozzle. Much of the research has focused on boron because it has a very high heat of combustion per unit weight and volume of fuel. However, this metal is undesirable for the present invention because it forms a number of oxide species that remain in the gaseous form after expansion in the combustion chamber exhaust nozzle.

Additional background art relating to the present invention is the method of transport and injection of the solid powdered fuels such as pulverized coal or metal powders into a combustion chamber. Two methods are used.

One is to transport the fuel in a dry state by means of a gas stream, usually consisting of the oxidizing medium, such as air. Injection into the combustion chamber is accomplished by means of one or more nozzles located near the oxidizer gas injection location in the combustor. This method is widely used in commercial applications with coal, but it is not generally used with metal powders. The latter are primarily intended for propulsion systems, such as rockets and ramjets, where the concept of dry powder fuels burned with a gaseous oxidizer is not as readily implemented.

The other is to prepare the powdered fuel in a liquid slurry. In the case of coal, the liquid is either oil or water in concentrations ranging generally from 30% to 50%. In the case of metal powder fuel, such as boron, the liquid is a hydrocarbon fuel, such as JP-10, which is also used to ignite the boron. Injection into the combustor is by means of a nozzle of a design similar to that used to inject liquid fuels into combustion chambers.

Additional background art relating to the present invention is research on the equilibrium combustion MHD generator, using coal as a fuel. In this system a two-stage, slagging cyclone combustor is used to burn coal which is fired with either preheated air or oxygen to temperatures approaching 3000° K. The first stage is used to separate the ash in the coal by the swirling action of the combustion gases. The ash is liquified by the high gas temperature of about 2000° K. in the first combustion stage and it is deposited as liquid droplets on the combustor walls, from which it is continuously removed by gravity to a drainage port located at the downstream end of the first combustor stage. Combustion in the first stage is fuel rich. The second stage is used for additional combustion to achieve 3000° K. The second stage oxidizer gases are introduced in a manner designed to cancel the swirl produced in the first stage. An alkali metal seed, usually potassium, is injected as a salt in the combustor to produce electrical conductivities in the 10 mho/meter range. Since the products of coal combustion are almost completely in gaseous form, they are mixed with the alkali seed and used as the MHD generator working fluid. The electrical conductivity in this generator is determined by the gas temperature in the generator because non-equilibrium ionization is not practical in combustion gas working fluids.

DISCLOSURE OF THE INVENTION

In the present invention, a cyclone combustor, which heats a hydrogen or low molecular weight inert gas working fluid by the oxidation of a fuel which produces substantially non-gaseous oxidation products, is combined with a non-equilibrium MHD generator to which the heated working fluid is supplied to produce electric power output at efficiency levels that are much higher than attainable at the present time. By substantially non-gaseous products is meant that any gaseous products comprise less than 1% of the working fluid as it is introduced to the MHD generator.

In a first section consisting of a cyclone combustor, the very high temperature, attainable with solid metal fuel particle combustion, is used to directly heat the working fluid which is introduced into the combustor in a swirling flow. Solid and liquid metal oxide products resulting from the combustion of the metal fuel particles with an oxidizer, such as oxygen, are inertially separated from the working fluid by the centrifugal forces produced by the swirling working fluid in the combustor. The metal oxide particles or droplets are deposited on the inside of the combustion chamber and are removed through an outlet from the combustor.

The heated working fluid flows to a second section, located downstream from the combustion section, where additional working fluid is introduced in a counterswirling manner to eliminate or greatly reduce the rotating motion in the working fluid. In addition, the working fluid in the second section is seeded with a small fraction of an easily ionized alkali metal, such as cesium, potassium, or lithium, in liquid o powder form. The working fluid then is expanded through a supersonic nozzle into the MHD generator where electric power is extracted from the working fluid.

The subsequent treatment of the working fluid depends on the application to which the MHD generator is put. If short power bursts, in durations up to a fraction of an hour, are desired, the working fluid can be exhausted to the environment. If long power bursts or continuous power are desired and the working fluid is, for example, helium, the working fluid is cooled in a heat exchanger in a terrestrial application and this heat is rejected to the atmosphere or cooled in a radiator and then rejected to the atmosphere. The cooled helium is compressed with a rotating compressor and re-injected into the combustor.

In a preferred embodiment for space applications, hydrogen is the working fluid which is mixed after exhausting from the generator with a liquid spray of lithium to produce lithium-hydride condensate, with the heat rejected into space in a radiator. The liquid lithium-hydride then is compressed in an electromagnetic pump to the combustor stagnation pressure Subsequently, waste heat from the system, or auxilliary heat, can be used to boil the lithium hydride and decompose it to hydrogen and lithium. The liquid lithium then is re-expanded to the spray condenser and the hydrogen gas is re-injected into the metal fuel cyclone combustor. There it is heated by inter-mixture, as previously described, with the combustion products of a beryllium (or other metal)oxygen mixture, which are then separated by a cyclonic action.

BRIEF DESCRIPTION OF THE DRAWINGS

Referring to the drawings.

DETAILED DESCRIPTION OF THE INVENTION

Figures 1, 2:
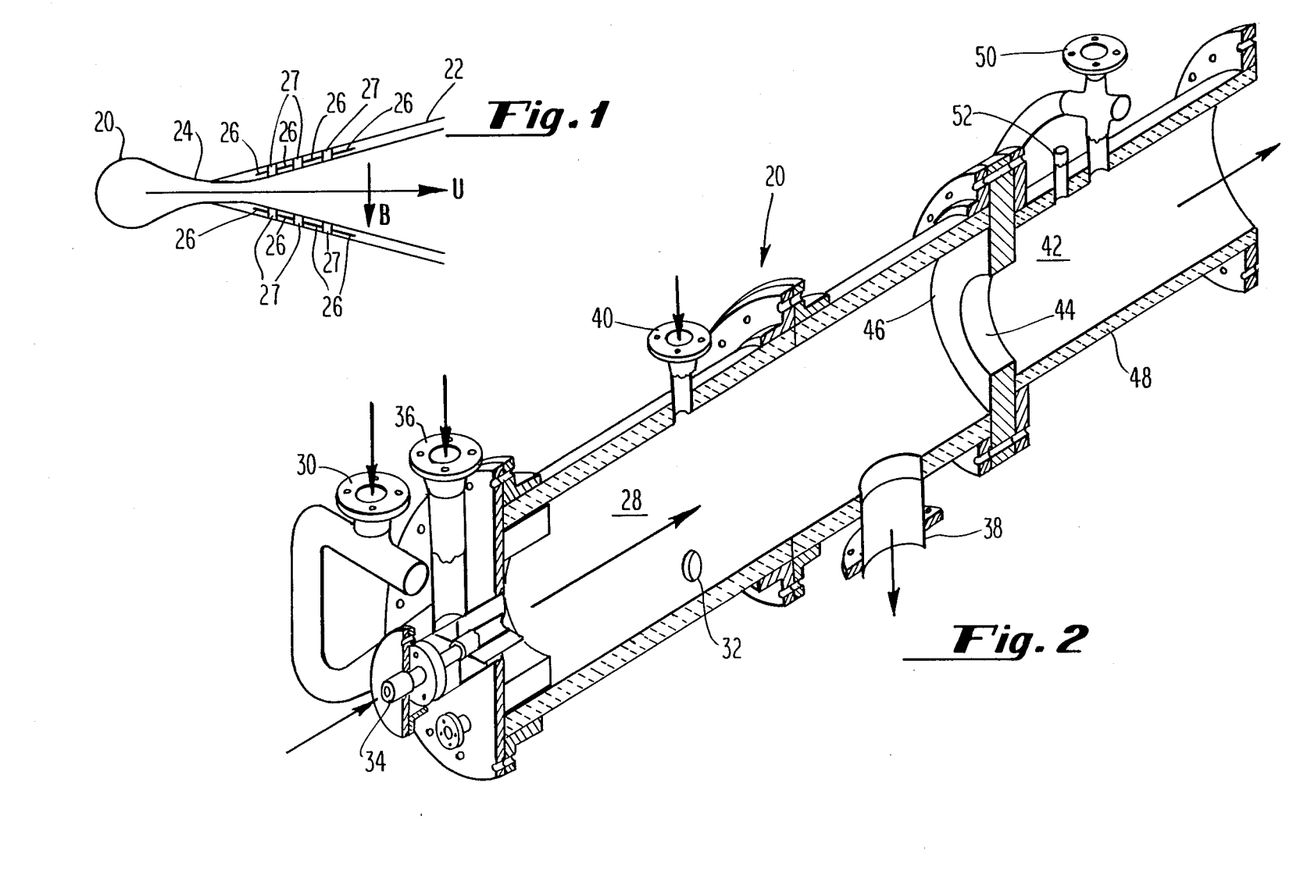
FIG. 1 is a cross-sectional schematic diagram of an MHD electrical generating system in which the present invention can be employed.
FIG. 2 a perspective longitudinal, sectional view of a first embodiment of a cyclone combustor which can used in the present invention.

Referring to FIG. 1, an MHD electrical generating system, constructed in accordance with the present invention, comprises a heat source 20, in the form of a cyclone combustor, for developing a working fluid, an MHD generator 22, of the closed cycle, non-equilibrium type, and a supersonic nozzle 24 through which working fluid developed in the cyclone combustor is supplied to the MHD generator. Electricity generated by MHD generator 22 is collected at a plurality of electrode pairs 26. The power output developed by MHD generator 22 is consolidated by external circuitry which is of conventional construction and operation and the details of which do not form a part of the present invention.

FIG. 2 shows a first embodiment of a cyclone combustor which can be used in the FIG. 1 system. The cyclone combustor serves to thermally energize an MHD generator working fluid, such as an inert gas or hydrogen, by contacting at least a part of the MHD working fluid with products of combustion such as obtained from a metal fuel. In particular, an MHD working fluid is introduced into a first chamber 28 at separate, axially displaced inlets 30 and 32. A metal fuel, in the form of metal particles in the micron size range, also is introduced into chamber 28 through an inlet 34. The metal fuel is fired by an oxidizer, such as oxygen introduced into chamber 28 through an inlet 36.

Various gases can serve as the MHD generator working fluid. Among those which can be used in the present invention are hydrogen and the lower molecular weight inert gases, namely, helium and, in special cases, argon. The fuel used is one which, upon oxidation, is highly exothermic and forms non-gaseous products. Typically, metals such as aluminum, magnesium, beryllium and zirconium are suitable.

The working fluid is introduced tangentially so that after oxidation, the swirling action of the working fluid flow drives the liquid oxide and solid oxide particles produced by the combustion toward the combustor wall. The inner surface of the combustor wall is covered by a layer of the liquid oxide combustion products. The accumulated liquid oxide is continuously removed from the combustor through a port 38 at the downstream end of chamber 28.

In the case of some metal fuels, such as magnesium, whose oxides have a very high temperature melting point, a fluxing agent, such as aluminum oxide, can be introduced at an inlet 40 which is upstream from oxide port 38. The combination of molten particles of magnesium oxide and aluminum oxide, in the proper amounts in the liquid oxide layer on the inner surface of the combustor wall, will lower the melting point of the oxide products of combustion As a result, for identical combustion temperatures, the viscosity of the liquid oxide layer will be reduced, thereby facilitating removal of the oxide combustion products from the combustor.

The working fluid is introduced at two axially separated inlets 30, and 32 when certain working fluids, which inhibit combustion, are being used. Helium is one such working fluid. With such working fluids, the locations at which the working fluid is introduced tend to be more critical than the amount of working fluid which is introduced. As a result, a gradual thermal energization of the working fluid may be required.

The thermally energized, swirling working fluid makes its way down chamber 28 and flows into a second chamber 42 through an opening 44 in a wall 46 between the two chambers. Wall 48 of chamber 42 can be either metal or ceramic, depending on the duration of operation of the combustor. The balance of the working fluid is injected into chamber 42 through an inlet 50 disposed to oppose the swirling of the working fluid passing through opening 44. The net effect is to reduce significantly or completely eliminate the swirling motion of the working fluid prior to its expansion in the supersonic nozzle between the cyclone combustor and the MHD generator.

An alkali metal seed, such as cesium, also is introduced in liquid or powder form into chamber 42 through an inlet 52. The alkali metal seed ionizes easily and renders the working fluid electrically conductive.

In an alternate arrangement of cyclone combustor 20, wall 46 between chambers 28 and 42 can be eliminated when both chambers can be operated at the high temperatures hat exist in the combustor. Such a modification avoids the engineering problem of designing opening 44 to produce the desired results. Here again, inlets 50 and 52, through which working fluid and the alkali metal seed are introduced, are located at a point downstream of oxide port 38 through which the metal oxide products of the combustion are removed.

In the practice of the present invention, the transport, injection and ignition of the metal fuel in a cyclone combustor differ substantially from the methods used in other powdered fuel combustor applications. One difference results from the fact that molecular gases adversely impact the MHD generator performance. Therefore, volatile hydrocarbon liquids cannot be used to transport the metal particles to the combustor in a slurry form. While liquid oxygen or hydrogen could be used as a transport media, special precautions, such as coating the metal particles, are required to prevent premature ignition in the feedpipe Liquid helium is unrealistic as a transport medium due to its low temperature. Consequently, the preferred mode of fuel particle transport is dense phase dry particle transport. Alternatively, for mobile MHD generator systems, an inert liquid, such as liquid argon, can be used to transport the metal particles in a slurry form. Such solid transport methods are well known to those skilled in the art.

Figure 3A:
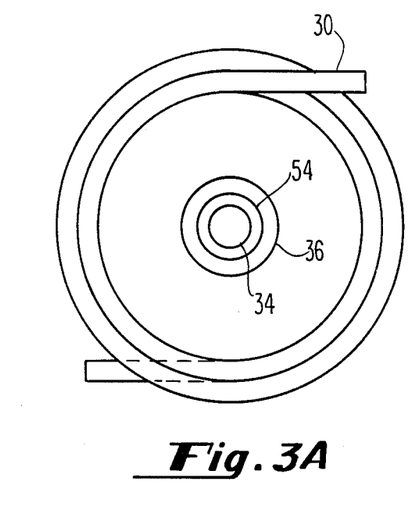
FIGS. 3A and 3B are schematic cross-section and longitudinal-section views, respectively, of a single inlet fuel injection system for the cyclone combustor of FIG. 2.
Figure 3B:
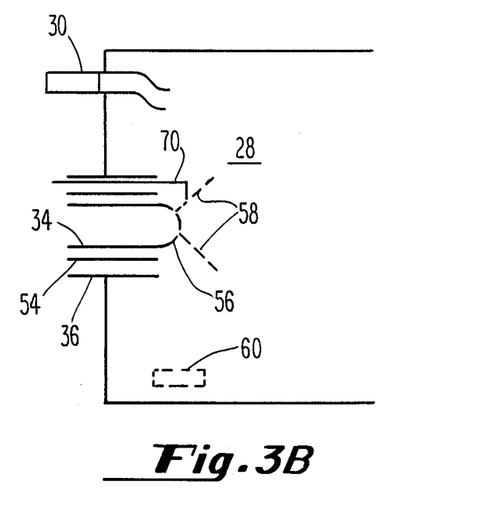

FIGS. 3A, 3B, 4A, and 4B illustrate representative arrangements for the injection of the metal fuel, oxygen, and MHD generator working fluid for the cyclone combustor shown in FIG. 2. In FIGS. 3A and 3B, the metal fuel and the oxygen are injected along the axis of the cyclone combustor as represented by inlets 34 and 36, respectively. A liquid hydrocarbon fuel can be used to pre-heat the combustion chamber and, if used, it would be introduced through an inlet 54, consisting of a tube which is coaxial with inlet 34. The metal fuel enters the combustion chamber through a perforated nozzle 56 having multiple openings which direct the fuel particle jet at an angle greater than 45° and less than 80° from the combustor axis. This is represented by dashed lines 58 in FIG. 3B.

The MHD generator working fluid, which represents most of the gas flow, is injected outside the fuel/oxygen injection location through an annulus 30 that is part of a swirl chamber located upstream of the closed end of chamber 28. The swirl gives the gas a rotational velocity, typically 100 feet per second, at the inner wall of the combustor, which is sufficient to centrifuge particles to the wall of the combustor. This method of injection of the working fluid is essentially identical with the method used to inject the secondary air in applicant's copending application Ser. No. 681,875, filed Dec. 11, 1984.

Alternatively, a tangential gas inlet 60, located near the closed end of chamber 28, can be used to inject the working fluid. In this case, the injection location is determined by the required temperature in the region of the combustor where the metal particles initially burn. This region is located immediately downstream of the injection location. If rapid combustion requires a higher temperature than the average temperature of chamber 28, this can be accomplished by injecting part or all of the working fluid further downstream from the closed end of the combustor.

Figure 4A:
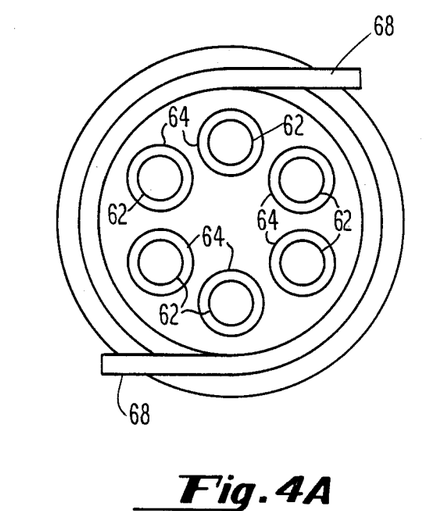
FIGS. 4A and 4B are schematic crosssection and longitudinal-section views, respectively, of a multi-inlet fuel injection system for the cyclone combustor of FIG. 2.
Figure 4B:
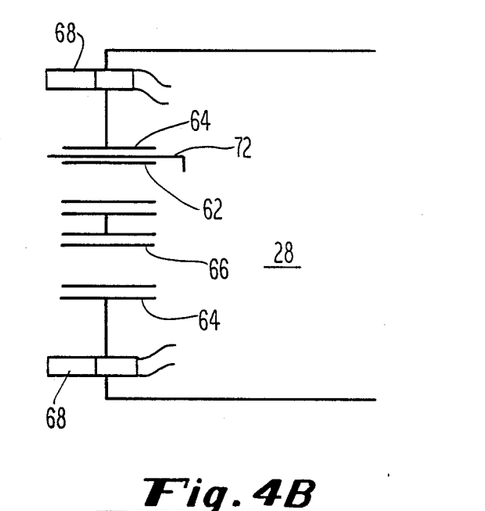

FIGS. 4A and 4B show an injection arrangement applicable to large cyclone combustors. Metal fuel and oxygen are injected into chamber 28 through a plurality of inlets 62 and 64, respectively. Liquid hydrocarbon fuel is injected through an inlet 66. Inlets 62, 64 and 66 are on a radius equal to approximately 50% of the inner radius of chamber 28. Working fluid is introduced into chamber 28 through a pair of inlets 68. This arrangement of fuel, oxygen and working fluid injection is similar to the injection of coal, primary air and secondary air in applicant's copending application Ser. No. 681,875, filed Dec. 11, 1984.

Volatile hydrocarbon fuels cannot be used to ignite the metal fuel particles as is done with coal or other metal fuels in rocket/ramjet engines because the molecular combustion gases resulting from the combustion of hydrocarbon fuels will prevent significant non-equilibrium ionization in the MHD generator. This is due to the high value of $\delta$ in combustion products which reduces electron heating, as shown in Equation (2). I ti snot feasible to separate hydrocarbon combustion products from the generator working fluid in the combustor or nozzle connecting it to the generator.

Metal particle ignition and combustion must take place in about 1 to 2 milliseconds. Otherwise, the high flow velocity in the cyclone combustor, which is determined primarily by the working fluid, will require an excessively long combustor. Consequently, in the present invention, one of two methods, used alone or in combination, can be used to ignite the metal fuel particles. A first method is to preheat the combustion chamber walls, which are initially lined with solid metal fuel oxide, to a temperature approaching the melting point of the metal oxides.

Typically this temperature range is 2300° K. to 3000° K., depending on the particular oxide. This can be accomplished with a hydrocarbon fuel, such as JP4, injected through inlet 54 in FIGS. 3A and 3B and inlet 66 in FIGS. 4A and 4B. After reaching operating temperature, the hydrocarbon flow is shut off and the metal fuel is injected and heated by wall radiation. It is then ignited by an electric discharge initiated by an electrode 70 in FIG. 3B or an electrode 72 in Figure 4B. The ignition electrode is located near the metal fuel injection point. Once ignition is achieved, ignition and combustion are maintained by black body radiation from the bulk flame in the combustor. Alternatively, electric ignition can be used without preheating.

The following equation illustrates the manner in which the combustor dimensions are controlled by the ignition and particle combustion times for aluminum which ignites at about 1000° K.:

$$t_{ig} = \frac{1.88 \times 10^{14} d}{T_f^4 - 1161^4} \tag{4}$$

where d is the particle diameter in microns $T_f$ is the source temperature in °R $t_{ig}$ is the particle ignition time in milliseconds To obtain ignition in a 10 micron particle in 1 millisecond requires a radiation source temperature of about 6500° R. Since this is above the melting point of all oxides, preheating the metal walls is insufficient in this case, and initial ignition requires an electric discharge. In addition, rapid combustion requires fuel particles in a size range of 10 microns or less. This particle size range has been used in coal combustion and metal fuel combustion and the technology for its production is well known to those skilled in the art.

The selection of specific metal fuels is determined by the performance which is specified for the MHD generator. This determines the stagnation temperatures and pressure of the combustor. The limitation on peak temperature that is attainable with metal fuel combustion in oxygen depends on the boiling point of the metal oxide which, in turn, is a function of the vapor pressure of the metal oxide. The following Table 2 shows the adiabatic flame temperatures at 1, 10 and 100 atmospheres for aluminum, at 1 atmosphere for magnesium, and at 100 atmospheres for zirconium and beryllium. A very low mol fraction of aluminum combustion products is sufficient to heat the noble gas from 298° K. to the stagnation temperature of the combustor. The calculations in Table 2 are estimates which convey the range of operating temperatures that may be attainable with these fuels.

For proper operation of the MHD generator, it is essential to limit the vapor pressure of the products of combustion to a very low fraction of the total gas pressure in the combustor. Otherwise, a high concentration of the metal oxides will enter the MHD generator in a gaseous state, where their presence would reduce the high velocity of the working fluid and quench the non-equilibrium ionization effect, as determined from Equation (2). Thus, the vapor pressure of the metal oxide determines also the peak allowable temperature that can be obtained with a specific fuel. For example, if aluminum is used as the fuel, its vapor pressure is about 5 atmospheres at 4000° K. and about 0.03 atmospheres at 3000° K. Thus, to use aluminum in this atmosphere range for heating either helium or hydrogen, the helium or hydrogen gas pressures in the combustor should be in the 50 to 100 atmosphere range. In contrast, the low vapor pressure of beryllium or zirconium oxides suggests that beryllium or zirconium could be used as a heat source to 5000° K. and possibly to 6000° K.

After ignition, metal particle combustion occurs in the vapor phase above the particle or on the surface, depending on the specific metal. The particular burnout time which, with ignition, controls the combustor dimensions, depends on particle size, oxygen concentration, pressure and the nature of the burning process. Again, with aluminum as an example, the following equation correlates burnout time for pressures of 20 to 100 atmospheres:

$$t_{burn} = (0.44 + 0.001P)(6.6 + 10^{-4}d^2)(X_{O2})^{-.9} \quad (5)$$

where $t_{burn}$ is the burning time in milliseconds
P is in atmospheres
d is in microns
$X_{O2}$ is the mole fraction of oxygen in the unreacted gas stream The total ignition and burning time from equations 4 and 5 is shown in the following Table 3 for typical conditions likely to exist in the combustor. Particle size must be under 10 microns for combustion times of 1 to 2 milliseconds as required for reasonable combustor dimensions.

TABLE 3

| CALCULATED ALUMINUM PARTICLE BURNING TIMES | | | |
|---|---|---|---|
| PRESSURE atm | d microns | $X_{O2}$ | BURNING TIME milliseconds |
| 100 | 10 | 0.075 | 0.37 |
| 100 | 50 | 0.075 | 9.2 |

A similar procedure can be used to obtain the burn time for other metal fuels. For the chosen metal, a particle size distribution is selected that will result in complete combustion in a first chamber dimensioned consistent with the MHD generator dimensions.

Translating the ignition and burnup time of an aluminum particle into combustor dimensions, a 91 megawatt thermal input to a combustor, capable of heating helium to 49 atmospheres and 4,000° K., requires first stage dimensions of 16cm internal diameter and 40 cm internal length. The above calculations are estimates designed to show how the invention may be practiced.

The working fluid is heated in the first chamber by convective heat transfer between the working fluid and the entrained metal oxide particles. The method of computing this heat transfer is well known to those skilled in the art. In addition, convective heating between the combustor wall and the working fluid can take place. In the second chamber, the working fluid exiting the first chamber mixes, by turbulent gas flow, with the additional working fluid injected into the second chamber.

The working fluid introduced into the two chambers of the combustor is injected in a manner that results in an inner forced vortex flow, surrounded by an outer

TABLE 2

| METAL OXIDE PARTICLE COMBUSTION AND HEATING OF NOBLE GASES | | | | |
|---|---|---|---|---|
| REACTION | ADIABATIC FLAME TEMP. [°K.] | FINAL MIXTURE COMPOSITION [MOL %] HEATED FROM 298° K. | | |
| | | He | $Al_2O_3$ | $Al_2O$ |
| $Al_s + \frac{3}{4}O_2 = .5Al_2O_3$ | 3800-[@ 1 atm.] | 92.5 | 6.5 | 1.0 |
| | 4333-[@ 10 atm.] | 90.8 | 8.0 | 1.2 |
| | 5000-[@ 100 atm.] | 88.3 | 10.1 | 1.6 |
| $Mg + O_2 = MgO$ | 3873-[@ 1 atm.] | | | |
| $Zr + O_2 = ZrO_2$ | 6250-[@ 100 atm.] | | | |
| $Be + O_2 = BeO$ | 6250-[@ 100 atm.] | | | | free vortex flow, in both of the chambers. The injection in the two chambers is counter-rotating, in such a manner that there is little, if any, residual swirl at the exit of the second chamber.

Because the metal oxide combustion products are removed from the combustor as a liquid and subsequently solidified, nearly all the enthalpy of the metal oxides, including the heat of fusion, is available to preheat the generator working fluid. This represents a significant percentage of the heat of combustion. For example, in beryllium combustion to beryllium oxide, the heat of combustion is 147 kcal/mol of beryllium. The enthalpy of beryllium oxide above 298° K. is 52 kcal/mol at 4000° K., 20 kcal/mol at 2000° K., and 10 kcal/mol at 1200° K. Since the melting point of beryllium oxide is about 2800° K., recovering the enthalpy in the beryllium oxide, by draining it from the combustor and using it to preheat the working fluid, considerably increases the efficiency of the fuel utilization.

The method of metal oxide removal depends on the presence or absence of gravity and on the duration of the power pulse. For a terrestrial application, the removal of the liquid oxides from the combustor is controlled by gravity. For the cyclone combustor shown in FIG. 2, the metal oxide liquid droplets deposit on the liquid metal oxide layer covering the inner wall of chamber 28. The liquid flows down the side walls and then along a diverging channel at its bottom which is inclined by about 5° to 10° in the downstream direction toward oxide port 38.

For short duration power pulses, for example 3 seconds or less, the liquid oxide can be simply collected in a chamber below oxide port 38. For the above example of a 91 MW combustor, using aluminum fuel, approximately 64 kg of aluminum oxide would be collected in a 10 second pulse. The specific gravity of aluminum oxide is about 2.25 gm/cc and will occupy a volume of $8533 cm^3$ which is approximately equal to the $8049 cm^3$ volume of chamber 28.

Figure 5A:
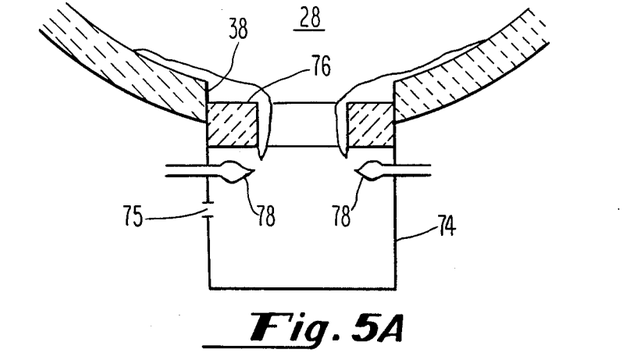
FIGS. 5A–5D are sectional schematic views of apparatus for disposing of oxide products of the FIG. 2 cyclone combustor.

Referring to FIG. 5A which shows a liquid oxide tap assembly which can be used in the present invention, the liquid oxide flows from chamber 28 through oxide port 38 into a tank 74 having an inside surface which is lined with a solid metal oxide of higher melting temperature than the oxide produced by the combustion, or of identical material as the oxide produced by the combustion To simplify removal of tank 74, a ceramic ridge 76 is provided at the top of the tank and a plurality of plasma torches 78, selected to correspond to the working fluid being used, are positioned immediately underneath the ceramic ridge. Plasma torches 78 provide heat at the top of tank 74 to maintain the oxides produced by the combustion in a liquid state at that point.

Figure 5B:
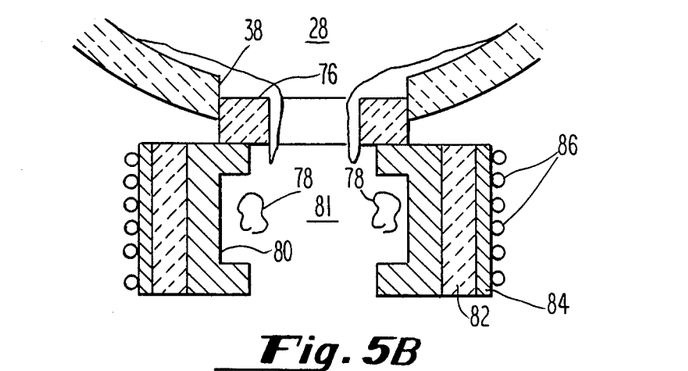
Figure 5C:
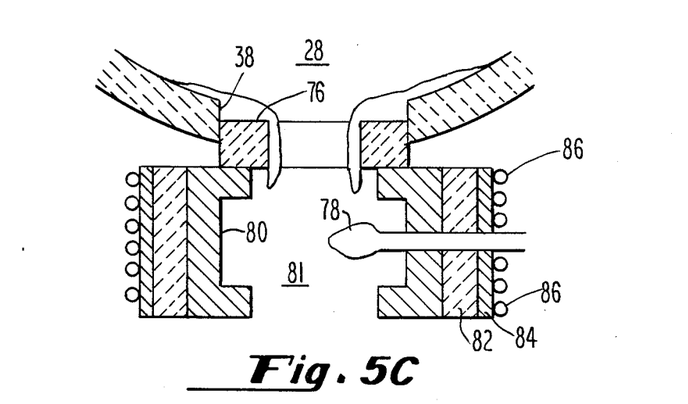

FIGS. 5B and 5C illustrate in more detail in two orthogonal views the arrangement of the upper part of the tank 74 which contains the plasma torches. A small chamber 81, called a "slag tap heater," is inserted at the top of the tank 74. The cavity of the chamber 81 is surrounded by a metal oxide lining 80, backed by a low density ceramic 82 which, in turn, is backed by a metal wall 84. Cooling means, in the form of water cooling pipes 86, extend around metal wall 84. The plasma torches, whose working fluid is the same as the generator working fluid, namely, helium or hydrogen, are used to maintain the metal oxide in a liquid state to prevent the oxide from freezing and blocking the opening in ceramic ridge 76. The oxide liquid stream will eventually break and fall to the bottom of tank 74 where it will freeze. The cooled gas from the plasma jet is drawn out of opening 75 in the wall of tank 74, in FIG. 5A.

Figures 5D, 6A, 6B:
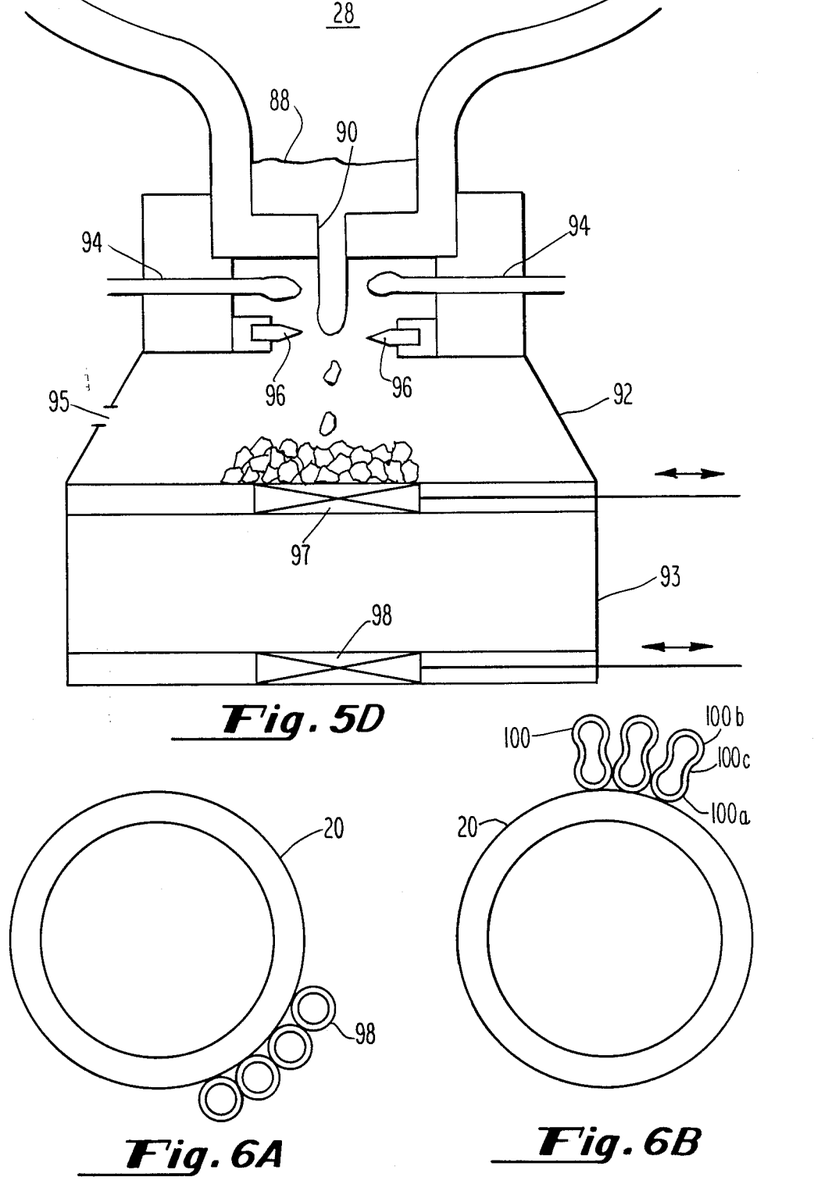
FIGS. 6A and 6B are sectional schematic views of apparatus for cooling the FIG. 2 cyclone combustor.

For continuous operation, apparatus as shown in FIG. 5D can be used for removal of the metal oxides. The liquid oxide is collected in a depression or pool 88 located at the liquid oxide port. The liquid oxide passes through an opening 90 at the bottom of pool 88 into a tank 92. A circular array of cold gas jets 94, injecting the same gas as the MHD generator working fluid, is used to freeze and break the liquid oxide passing through opening 90 into solid pieces. This may be augmented by a pair of metal shears 96 to aid in shattering and breaking the oxide. The energy absorbed by the gas injected by jets 94 is transferred to the main working fluid flow by extracting it through opening 95 in the wall of chamber 92 and mixing it with the MHD working fluid flow. After the upper portion of tank 92 is filled, the accumulated solid oxide pieces are discharged through valve 97 to the lower portion of the tank 93. Valve 97 is then closed and valve 98, in the wall of the lower chamber 93, is opened to allow the pressure in the chamber to drop to the environmental pressure.

For space applications of the present invention, where there is no gravity, the liquid oxide can be removed by gradually forcing the liquid oxide on the combustor wall downstream by the viscous gas drag acting on the liquid oxide layer. By using a reentrant exit constriction to chamber 28, liquid oxide will collect in this region and one or more openings, similar to opening 90 in FIG. 5D, can be used to force the liquid oxide out of the high pressure combustor region. The dimensions of opening 90 must be small enough to prevent combustion chamber gases from passing through opening 90 and large enough to allow continuous liquid oxide flow without freezing and blocking the opening. A wall heating arrangement similar to that shown in FIGS. 5B and 5C can be used for this purpose.

Cooling of the combustor walls is complicated by the high heat release rates in the combustor. At the high pressure and temperature conditions in the combustor, heat transfer to the walls is controlled by black body radiation from the particulate-laden gas. For operational times of less than 10 seconds, a heat sink copper wall will remain below its melting point for 3000° K. combustion temperatures. However, a limited amount of surface melting will occur at 4000° K. Thus, heat sink operation in the combustor can be used in the present invention only for short periods of time.

For longer time periods, active cooling of the combustor wall is required. At 4000° K., gas-particle radiation is, assuming black body radiation from the particle-laden gas stream, 1.45 $kw/cm^2$ to the wall, while at 3000° K., gas-particle radiation is 47 $kw/cm^2$. Three cooling methods, either alone or in combination, can be used to cool the combustor walls.

First, the liquid wall layer formed by the products of metal-oxide combustion can be allowed to approach the combustion temperatures. This procedure is currently used in cyclone coal combustors to reduce the wall heat transfer. By letting the liquid oxide gas interface temperature exceed 95% of the combustion temperature, the heat transfer rate can be drastically reduced. For terrestrial applications, gravity dominates the liquid oxide flow on the combustor walls, while in space it is the viscous drag from the gas flow field. Those skilled in the art appreciate that there are well developed analytical methods to compute the liquid oxide layer thickness on the inside of a horizontal, cylindrical combustion chamber which can be used to determine the liquid oxide thickness as a function of combustor operating parameters. This determines under what conditions a sufficiently thick oxide layer can be maintained on the combustor walls to reduce the heat-transfer rate to acceptable limits.

FIGS. 6A and 6B illustrate the apparatus which may be used to employ another method for cooling the combustor wall by using a boiling liquid metal, such as sodium. In FIG. 6A, the outside surface of combustor 20 is surrounded by pipes 98 which carry liquid metal. This arrangement can be used for cooling rates up to 1 $kw/cm^2$.

FIG. 6B illustrates the apparatus which may be used for higher heat transfer rates. A series of heat pipes 100 are arranged axially around combustor 20 and carry cooling fluid, such as sodium. The heat pipe design is one used by those skilled in the art. With sodium, the heat pipes can be used at the 1 to 1.5 kw/cm$^2$ range. Although heat pipe technology is well known to those skilled in the art, it will be useful to explain that a heat pipe consists of an evaporator 100a which is in contact with the combustor wall, a condenser 100b to which the heat is transferred by the sodium vapor, and a wick 100c which returns the condensed liquid sodium to the evaporator. The wick is a porous solid material that lines the inside wall of the heat pipe and moves the liquified coolant from the condenser to the evaporator by capillary action.

Figure 7:
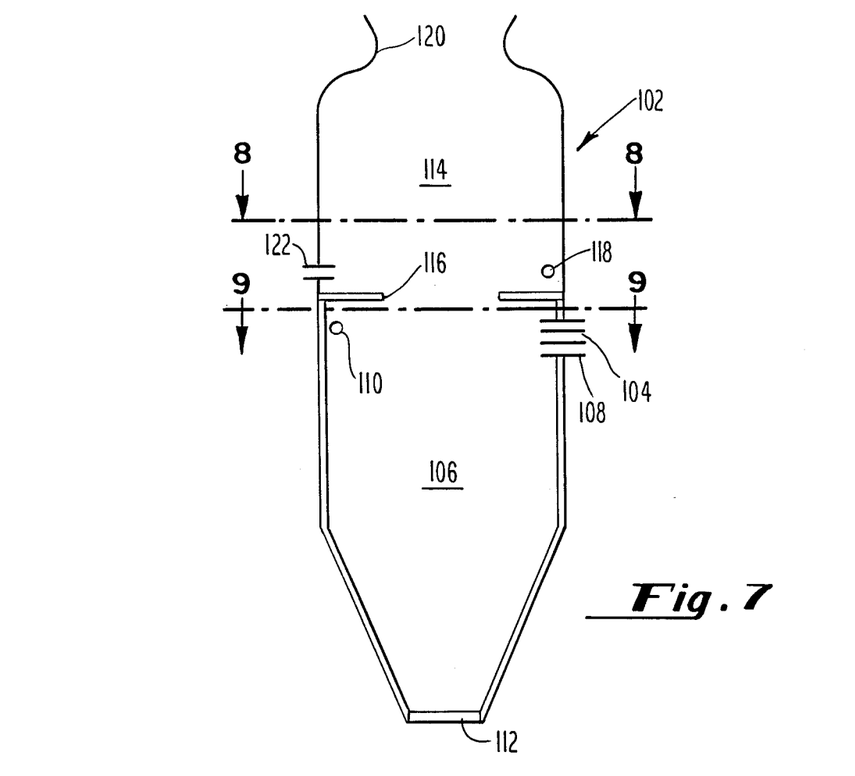
FIG. 7 is a vertical sectional schematic view of a second embodiment of a cyclone combustor which can be used in the present invention.
Figure 8:
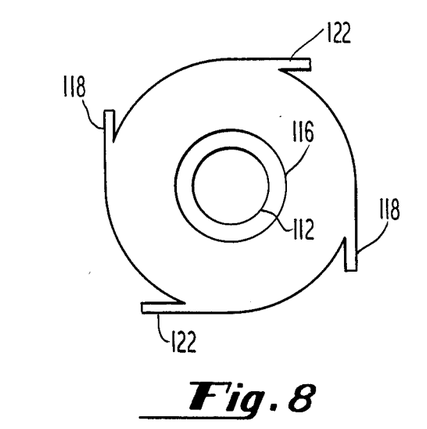
Figure 9:
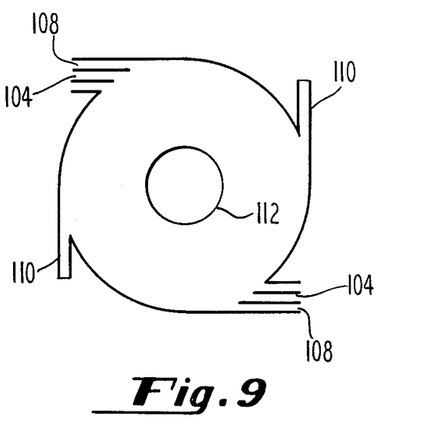
FIGS. 9 are sectional views taken along lines 8—8 and 9—9, respectively, of FIG. 7.

FIGS. 7, 8 and 9 illustrate an alternate vertical cyclone combustor 102 which is more appropriate for use when the metal fuel oxide combustion products are solid particles instead of liquid particles. The vertical cyclone combustor 102 is a two-chamber, vertical cyclone combustion system in which metal particles, in the micron size range, are injected through inlets 104 at two to four locations into a first chamber 106. Oxygen also is introduced into chamber 106 at two to four locations through inlets 108 which surround metal fuel inlets 104. The MHD working fluid also is injected into chamber 106 at two to four separate locations through inlets 110.

After oxidation, the swirling action of the gas flow, clockwise for the embodiment illustrated in FIGS. 7 and 9, drives the solid oxide particles toward the combustor wall. The oxide particles spiral downward and are continuously removed from the combustor through a port 112 at the bottom of chamber 106.

The working fluid flows into a second chamber 114, above and coaxial with chamber 106, through an opening 116. The balance of the working fluid is introduced into chamber 114 through inlets 118 in a counterclockwise direction to remove the swirling of the working fluid prior to its expansion in a supersonic nozzle 120 for delivery to MHD generator. An alkali metal seed is introduced into chamber 114 through inlets 122.

The solid oxide products can be removed from the vertical cyclone combustor in FIGS. 7, 8 and 9 through opening 112 to a chamber similar in design to chamber 93 in FIG. 5D. The Hall effect in MHD generators causes one end of the generator and all components connected to it to have a higher voltage than the opposite end of the generator. It is the current practice in MHD design to electrically isolate the combustor from the fuel, oxidizer, working fluid feed lines and from the oxide removal apparatus to prevent the Hall voltage from shorting to ground. To accomplish this in current practice, in equilibrium combustion MHD generators fired with slagging coal combustors, the liquid slag, which is electrically conducting in the liquid state, is quenched in a water tank. This allows electrical isolation of the combustor from the fuel, oxidizer and slag removal systems. In the present invention, water cannot be used to cool the metal oxides because the water vapor would contaminate the gases in the combustors rendering them unsuitable for use in the MHD generator. It is, therefore, necessary to assure that the metal oxide is frozen in tank 74 of FIG. 5A, or tank 93 of FIG. 5D before the oxide is removed from the chamber and allowed to contact a component at a different voltage from the combustor voltage (such as a part of the combustor support at ground voltage).

The present invention preferably employs a segmented electrode Faraday generator, as shown schematically in FIG. 1. With the generator working fluid being a low molecular weight gas, such as an inert gas or hydrogen, the preferred channel wall construction is the one used for non-equilibrium, closed cycle MHD generators. Tungsten is the preferred material for electrodes 26 and boron-nitride or similar materials is preferred for insulators 27. These materials have been used previously. However, the high power output attainable by the present invention results in very high current levels to the electrodes and very high convective and electric heat transfer rates to the walls.

By way of example, at 4000° K. and 70 atmospheres stagnation temperatures, the peak convective heat transfer at the wall near the generator entrance at Mach 1.5 is about 0.5 kw/cm$^2$. To maintain the boron-nitride below its peak operating temperature of 2700° K., active cooling is required for operating times greater than several seconds. This can require the use of boiling heat transfer with sodium, arranged in a manner similar to that shown in FIG. 6A. Alternatively, a peg wall arrangement, previously used for combustion MHD channels, in which metal pegs are imbedded in boron-nitride walls can be used. This latter arrangement has not been required or used in prior closed cycle MHD generators.

The cathode wall cooling is not as critical because electron emission cools the electrodes. In addition, the high thermionic emission currents, up to several hundred amperes per square centimeter, of the generator can be obtained with either cesiated tungsten with an electrode surface temperature of 1200° K. to 1500° K. or by operating the tungsten electrode near its melting point of 3670° K. At this temperature, the thermionic emission is nearly 400 amp/cm$^2$.

A more critical problem is the anode wall cooling where heating rates in the several kilowatt per square centimeter range may develop due to the anode voltage loss, which can be in the range of 10 volts or more. Here, the use of boiling heat transfer or a heat pipe design, in which the anode is the evaporator side of the heat pipe, can be used. Alternatively, transpiration cooling of the anode wall can be used.

In the present invention, the MHD generator is operated in the self-excited mode in which the generator is used to augment an initial modest applied magnetic field to the level required for proper and optimum performance. In combustion MHD generators, where self-excitation is well established, the self-excitation current is drawn from the upstream electrodes in a Faraday connection, or from the total output voltage in diagonally connected generators or from a separate generator. As shown in FIG. 1, the axial electrically conducting gas flow U flows through a transverse applied magnetic field B produced by a magnetic coil (not shown) surrounding the electrodes 26. A transverse current flows to the segmented electrodes 26, each of which is separated from adjacent electrodes by one of insulator segments 27. For the non-equilibrium MHD generator used in the present invention, self-excitation is provided with the downstream electrodes in the Faraday connection to power the magnet coil. This results because power generation cannot commence without first igniting the working fluid. At the downstream electrodes, the higher induced voltages and lower initial pressures are more conducive for this purpose. Also, the generator can be operated at a higher initial stagnation pressure which is more conducive to operation without a diffuser in a sea level, open cycle, pulse power application.

Figure 10A:
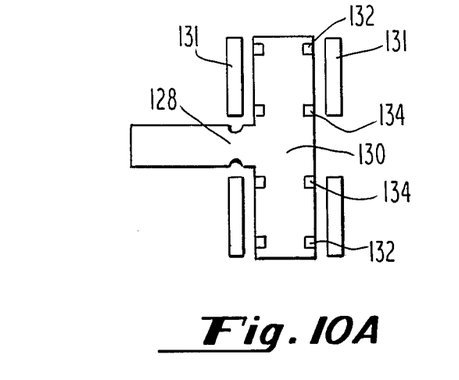
FIGS. 10A 10B sectional schematic views of a disc-type MHD generator which can be used in the present invention.
Figure 10B:
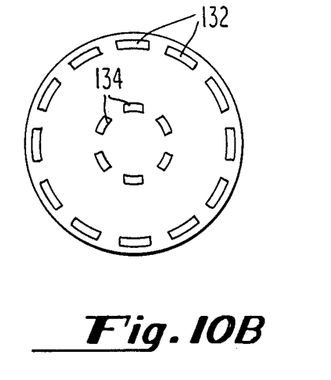

The present invention also is applicable to a disc-type MHD generator, such as illustrated in FIGS. 10A and 10B. This generator is a Hall device which operates as follows:

The working fluid expands through a disc type nozzle 128 to supersonic velocity. The working fluid continues to expand radially in generator 130 and flows through the magnetic field created by split coil solenoid magnets 131. At Hall parameters greater than unity, a radial electric field and current, called Hall field and Hall current, are induced which are collected by anodes 132 and cathodes 134 placed at the entrance and exit of the generator. Although not as flexible as the Faraday generator, the disc-type generator nevertheless finds application in certain areas and can operate effectively within the present invention.

For long-time operation, such as greater than hundreds of seconds, the present invention can be employed by using a conventional Brayton cycle, either in space or terrestrially. The generator working fluid can be a low molecular weight gas, such as helium or hydrogen.

Figure 11:
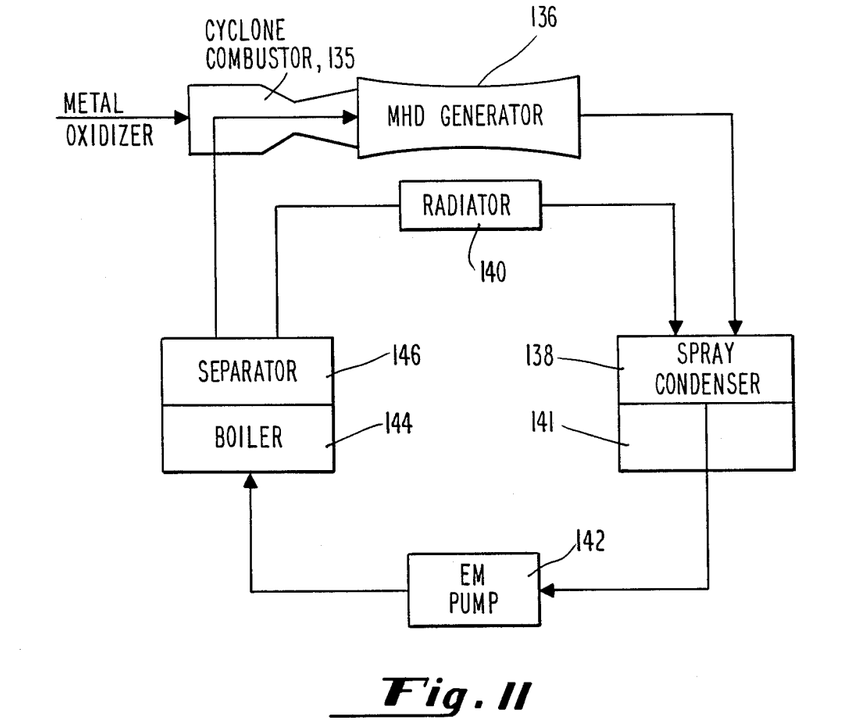
FIG. 11 is a block diagram of a closed cycle MHD system which uses the present invention.

The present invention can also be practiced with the lithium-hydride MHD power cycle for space application. This cycle has been previously disclosed for use with a nuclear heat source. In this closed cycle, space-based MHD system, hydrogen is the generator working fluid. Referring to FIG. 11, liquid lithium is injected in the diffuser at the exit of generator 136. Hydrogen and lithium combine to form lithium-hydride in the spray condenser 138. For a pulsed power application up to about 1000 seconds, the lithium-hydride can be stored in a receiving vessel 141 for subsequent radiative heat rejection into space Alternatively, and preferably, the lithium-hydride is electromagnetically pumped in an EM pump 142 to the combustor stagnation pressure. Then the lithium-hydride is heated in the boiler portion 144 of a separator/boiler unit which uses waste heat from the cyclone combustor/MHD generator as well as auxilliary combustion heat until the lithium-hydride decomposes. Hydrogen is supplied from the separator portion 146 of the separator/boiler unit to the cyclone combustor 135, where it is mixed with the metal fuel and oxidized in a manner described in connection with FIG. 2. The hydrogen is seeded with cesium and flows to the MHD generator 136, while the lithium liquid flows into radiator 140 where it is cooled and then supplied to spray condenser 138. In the continuously operating cycle, radiative heat rejection to space occurs in real time.

While this cycle has previously been proposed at 1 atmosphere peak operating pressure, no method of operating a system with the cycle of the necessary temperature (above 1741° F., 1223° K.) associated with that condition, except possibly by a nuclear heat source, was disclosed.

In contrast, utilizing the present invention, it is possible to heat the fluid, at pressures of up to 100 atmospheres, to the 2500°–4000° K. range, at which pressure the lithium-hydride dissociation temperature is about 2115° K. Using either lithium or added cesium as the seed, a seeded energized hydrogen gas has a conductivity, on the order of 50–100 mhos/m, which allows good generator performance.

For example, at a stagnation temperature of 4000° K., Mach 1.5 in the generator, a 4 Tesla field, 50 mhos/m, and a load parameter, K, of 0.7 the power output density is 7200 MW/m$^3$. It is highly probable that these conductivities are attainable in the 3000°–4000° K. range, because at 100 atm the dissociation of $H_2$ to H increases from 1.5% to 15%. Thus, the vibrational states will be readily excited to the electron temperature.

The major advantage of the LiH cycle is the replacement of the gas compressor with a liquid electromagnetic pump. Using extrapolated data on the electrical conductivity of liquid LiH at about 1000° K., and assuming that the straight line relationship on a semilog plot of conductivity vs. 1/T is still valid, one obtains a conductivity for LiH of 4000 mhos/m at 1366° K. The viscosity of LiH is 0.3 centipoise at 1033° K. and 0.24 centipoise at 1144° K. Thus, with a 100 m/s velocity in a 1 m. long electromagnetic pump, and a 4 Tesla field, the theoretical pressure increase is 64 atm. It is thus possible to operate the LiH cycle with a heat rejection temperature in the 1000+° K. range. This cycle should have efficiencies in the 30–50% range. Of even greater importance, its high heat rejection temperature and constant heat rejection temperature (which is a feature of the Rankine cycle) results in a compact, lightweight space system, which is of major importance for space applications.

EXAMPLE OF APPLICATION TO A 100 MWe-1000 SECOND SPACE BASED MHD SYSTEM

For 1000 seconds operation in space application, the consumable weights generally dominate the total system weight. For this reason, a continuously operating closed cycle is of interest, despite the short operating time. However, the requirement of high power density in the generator is incompatible with a Brayton cycle because the low isentropic generator efficiency at high power is insufficient to drive the gas compressor. On the other hand, the lithium hydride cycle may be suitable. The following examples will show the relative benefits of different system configurations. The MHD systems considered are:

the open cycle helium blowdown (OC-He)

the open cycle hydrogen blowdown (OC-$H_2$)

the closed cycle, hydrogen-lithium storage system, with post power pulse heat rejection (CC-LiH-Storage)

the closed cycle, hydrogen-lithium hybrid cycle (CC-LiH), with real time heat rejection, as shown in FIG. 11. In this case, it is assumed that, due to recirculation, only 20 seconds worth of Li and $H_2$ inventory is required.

TABLE 4

| COMPARISON OF CONSUMABLES WEIGHTS, OUTPUT ENERGY DENSITY, AND STORAGE VOLUME FOR 100 MWe-1000 SECOND MHD | | | | | |
|---|---|---|---|---|---|
| SYSTEM | CONSUMABLES- | WEIGHT, KG | E.D., MJ/KG | T, °K. | GAS VOLUME, M$^3$ |
| OC—HELIUM | Be—O$_2$—He | 27,479 | 3.6 | 4000 | 157 |
| OC—HELIUM | Be—O$_2$—He | 22,663 | 4.4 | 6000 | 108 |

TABLE 4-continued
COMPARISON OF CONSUMABLES WEIGHTS, OUTPUT ENERGY DENSITY, AND STORAGE VOLUME FOR 100 MWe-1000 SECOND MHD

| SYSTEM | CONSUMABLES- | WEIGHT, KG | E.D., MJ/KG | T, °K. | GAS VOLUME, M$^3$ |
|---|---|---|---|---|---|
| OC—HYDROGEN | Be—O$_2$—H$_2$ | 16,683 | 6.0 | 4000 | 79 |
| CC—LiH-Store | Be—O$_2$—H$_2$ | 29,362 | 3.4 | 4000 | 102 |
| CC—LiH | Be—O$_2$—H$_2$ | 13,432 | 7.4 | 4000 | 14 |

The term E.D. is the energy density, defined as the power output in MW divided by the total mass flow rate of all consumables in kg/sec. Table 4 shows the relative performance of these systems, as a function of the total electrical energy output per total mass of consumables (i.e., generator working fluid, metal fuel, and oxidizer), and as a function of the total volume required to store the consumables, with the gases stored at 10,000 psi. (A composite material structure is assumed. Liquid gas storage would reduce the volume by about ⅓.) The assumed fuel is beryllium (due to its light weight), burned with oxygen, and used to heat He or H$_2$ to 4000° K. or 6000° K., respectively. In all cases, a 100 MWe output is assumed, and the enthalpy extraction is 33%. It is assumed that the MHD system weight is approximately 4000 kg, or 25 kw/kg, with 50% of the weight in the superconducting magnet.

It can be seen from Table 4 that the CC-LiH cycle requires the least consumable inventory. Therefore, the LiH cycle is clearly the most attractive, both in terms of total weight of consumables and storage volume required. For the other systems, almost all the storage volume is due to hydrogen or helium. The LiH storage system is not as attractive due to the weight of the stored LiH. For all the MHD systems, the Be weight is 4691 kg, and the O$_2$ weight is 8340 kg. (It should be noted that, since He does not dissociate, there is a considerable weight benefit in maximizing its peak operating temperature to 6000° K.)

As noted previously, another advantage of the LiH cycle is that heat rejection can be at high and constant temperature.

APPLICATION TO A TERRESTRIAL, LAND OR SHIP BASED PULSED POWER SYSTEM

As another illustration of the potential of this invention, an application requiring 3 second long, 70 MW (electric) net power output pulse, at a 48 second repetition rate, is considered. A total of 100 power pulses in a 24 hour period are assumed, and the source of the consumables is the sea, and the power for their production as well as other auxiliary power supplies, are provided by other sources. The fuel is magnesium, fired with oxygen, at 125 atm. and 4000° K. stagnation temperature. The generator working fluid is either hydrogen or helium, seeded with cesium, and it produces 95 MW gross output, of which 25 MW is used for powering the self-excited MHD magnet.

It is estimated that the MHD system weight and volume is about 48,000 to 90,000 lb. and 1200 cu. ft., including consumables and their storage vessels.

Consumable Storage: The light molecular weight of He and H$_2$ results in large storage vessel requirements. Two technologies can be used to reduce the gas volumes, liquefaction and ultra-high pressure storage, both of which are commercially available. However, the latter requires a gas liquefaction plant. For this reason, the preferred method of practising this invention is to use ultra-high pressure, 10,000 psi storage for the O$_2$ and H$_2$, using filament wound matrix composite containers. In the case of H$_2$, all material will be exhausted to the atmosphere as used. The number of containers will depend on the storage requirements in the specific application. For illustration purposes, all consumables are assumed to be stored in one vessel, with sufficient material for 100 pulses per 24 hours.

In the case of helium, on the other hand, it will be recycled and only sufficient He will be stored for one 3 second pulse. (In addition, helium makeup is required to replace losses due to leakage.) The peak helium pressure is somewhat above the combustor stagnation pressure of about 125 atm, and it is collected at the stagnation exhaust pressure from the generator of about 13 atm. It is compressed in the 45 second off-time between pulses.

For the open cycle system, Mg is stored in a sphere of 5.3 ft. diameter as crushed particles. As required, it is pulverized in a pulverizer to 10 microns size or less, and injected into the combustor, which is part of the MHD power system. The O$_2$ is stored at 10,000 psi in a 5.8 ft. D. sphere, and it is also injected into the combustor. The H$_2$ is stored in a 6' D. 29' long cylinder at 10,000 psi. It is also injected as required for each 3 second pulse into the combustor. The hydrogen is burned in air at the generator exit diffuser. There is sufficient storage for 100 pulses.

For the closed cycle system, Mg is stored in a sphere of 5.3 ft. diameter in crushed particles. As required, it is pulverized in a pulverizer to 10 microns size or less, and it is injected into the combustor, which is part of the MHD power system. The O$_2$ is stored at 10,000 psi in a 5.8 ft. diameter sphere. It is also injected into the combustor. There is sufficient Mg and O$_2$ storage for 100 pulses. The high pressure helium is stored in a 5.8' diameter sphere at 1840 psi (125 atm), and it is also injected as required for each 3 second pulse into the combustor. The He is collected in low pressure cylinder at 190 psi, 6 feet in diameter and 29 feet long. After the completion of the 3 second power pulse, the helium is recompressed in 45 seconds to 1840 psi, using a compressor.

Table 5 lists the consumable weights and storage volumes, as well as those for the MHD system, and auxiliaries.

TABLE 5

COMPARISON OF CONSUMABLE AND COMPONENT WEIGHTS, VOLUMES AND AUXILIARY POWER FOR A 70 MWe-3 SECOND-NET OUTPUT MHD POWER SYSTEM WITH STORAGE FOR 100 PULSES

FUEL OXIDIZER: Mg and $O_2$, Mg and $O_2$ COMBUSTOR CONDITIONS-4000° K. and 123 ATM
$O_2$, $H_2$ STORAGE: 680 ATM., He STORAGE: 123 ATM. and 13 ATM. - One Container/gas

| SYSTEM COMPONENT | WEIGHT, lb | VOLUME, cu. ft. | EXTERNAL AUXILIARY POWER, kw |
|---|---|---|---|
| $Mg-O_2-He$ | | | |
| Magnesium | 8508 | 79 | 1.1 MW (from $MgCl_2$ E.C. Cell) |
| $O_2$ | 5628 | 103 | 0.1 MW (electrolysis) |
| $O_2$ Container | 11013 | | |
| He-High Pressure | 97 | 79 | 2.4 MW (compress. from 13 atm.) |
| He-Low Pressure | — | 734 | — |
| He Containers-2 | 2500 | | |
| Combustor | 1060 | 2 | |
| MHD Magnet | 3744 | 22 | (25 MW-from MHD Generator) |
| MHD Auxiliaries | 1000 | 2 | 0.2 MW |
| He Compressor-Motor | 4800 | 20 | (counted under He) |
| Sub-Total | 38350 | 1041 | 3.8 MW |
| Other Aux. | 9590 | 205 | 0.9 MW |
| TOTAL | 47940 | 1246 | 4.7 MW |
| $Mg-O_2-H_2$ | | | |
| $H_2$ | 2461 | 721 | 0.38 MW (electrolysis) |
| $H_2$ Container | 47000 | | |
| Mg, $O_2$ Ssytem | 25149 | 182 | 1.1 MW (Mg), ($O_2$ from $H_2$) |
| Comb.-MHD System | 5804 | 26 | 0.2 MW |
| $H_2$ Compressor | 1550 | 4 | 0.31 MW |
| Other Aux. | 9590 | 205 | 0.9 MW |
| TOTAL | 91554 | 1138 | 2.9 MW |

Consumable Production: One benefit in selecting magnesium, oxygen and hydrogen is that they can be produced by the electrolysis of sea water, as required, especially on ships. The consumable production rate can be tailored to pulse repetition requirements, and the power for their production can be supplied by the main ship generators.

Hydrogen and oxygen can also be produced by electrolysis. Magnesium can also be produced by the Dow method, which is currently used to produce magnesium from sea water, in the form of $MgCl_2$.

Therefore, a low continuous power source can be used to produce high pulsed power by continuously replenishing the MHD power system consumables from sea water.

Based on an estimated 30% conversion of thermal energy in the He or $H_2$ to electricity in the MHD generator, a 70 MW net output, requires a 95 MW gross output to power a self-excited MHD magnet using ammonia cooling. Thus, the thermal input power is 300 MW Table 5 gives the consumables required for 100 pulses at this power output level.

Auxiliary Power Requirements: The auxiliary power requirements are small (several MWe) compared to the 70 MW-3 second pulse, repeated one hundred times per 24 hour period. Table 5 lists the power required for gas compression and consumable production from sea water for 100 pulses per day, assuming 10 hour production cycles. Only 1.1 MW are required to produce Mg from $MgCl_2$ for 100 pulses, assuming 50% efficiency in the Dow process. One day was selected for illustration purposes. The benefit of this pulsed power approach increases with increasing operating time between refueling of the auxiliary power systems used for electrolytic production of the MHD system consumables.

It is assumed that the 10,000 psi storage cylinders for $O_2$ and $H_2$ are recharged in 10 hours, using a 3 stage, intercooled compressor. The $H_2$ compression power is only 0.33 MWe. With He, compression takes place in 45 seconds from 13 atm at the generator exhaust to 125 atm in the combustor. This requires 2.4 MWe compressor power.

The results in Table 5 show that the $H_2$ "open cycle" system weighs about 91,554 and requires a total volume of about 1138 cu. ft. The He "closed cycle" system weighs 47,940 lbs. and has a volume of 1246 cu. ft. These numbers include an approximate 25% weight and volume estimate for all auxiliary systems, in addition to the MHD generator and gas compression auxiliary power requirements, which are tabulated separately in the Table. A weight of 2 lb/kw was used for the He compressor-motor, which is applicable to a short operating time (45 seconds) unit, and 5 lb/kw for the $H_2$ compressor.

The $H_2$ storage vessel weight is the primary weight and volume component in the $H_2$ system. The He low pressure container is the main volume element in the He system. However, the low gas pressure in He results in a much lower weight than in the $H_2$ system. It would appear that on a weight, volume and safety basis, the helium system is preferable.

While the present invention has been described with respect to specific embodiments, it may be embodied in other specific forms without departing from its spirit or essential attributes. Accordingly, reference should be made to the appended claims, rather than the foregoing specification and accompanying drawings for an indication of the scope of the invention.

I claim:

1. An MHD generator system adapted to non-equilibrium power generation at a preselected temperature and pressure comprising:
   I. a cyclone combustor having:
   (a) a first section for directly heating a working fluid by oxidation of a magnesium, aluminum, beryllium or zirconium fuel that, upon oxidation, produces products which are nongaseous at said preselected temperature and pressure,
   (b) first inlet means for introducing said fuel into said first section, (c) second inlet means for introducing an oxidizer into said first section to fire said fuel,
(d) igniting means for igniting said fuel and said oxidizer in said first section,
(e) third inlet means for introducing into said first section a first quantity of a working fluid selected from the group consisting of hydrogen and low molecular weight inert gases,
(f) means for imparting a swirling action to the contents of said first section, said non-gaseous oxidation products being entrapped in the swirling flow of said first quantity of said working fluid and driven against an inside surface of said first section,
(g) first outlet means for collecting and removing said non-gaseous oxidation products driven against said inside surface of said first section,
(h) a second section downstream from said first section,
(i) fourth inlet means for introducing into said second section a second quantity of said working fluid swirling in a direction opposite to the swirling direction in said first section to oppose and combine with said first quantity of said working fluid and to neutralize said swirling action, and
(j) second outlet means for delivering heated working fluid;
II. an MHD generator for generating electricity; and
III. a nozzle disposed between said second outlet means of said cyclone combustor and said MHD generator for supplying heated working fluid from said cyclone combustor to said MHD generator.

2. An MHD generator system, as recited in claim 1, wherein said working fluid is selected from the group consisting of hydrogen, helium and argon.

3. An MHD generator system, as recited in claim 1, wherein said combustor further includes means for introducing into said working fluid an alkali metal seed gas.

4. An MHD generator system, as recited in claim 3, wherein said alkali metal seed gas is lithium, potassium or cesium.

5. An MHD generator system, as recited in claim 4, wherein said alkali metal seed is cesium.

6. An MHD generator system, as recited in claim 1, wherein the relative dimensions of said combustor and the relative flow rates of fuel, oxidizer and working gas introduced by said inlet means are all adapted to deliver said working fluid to said MHD generator at a stagnation temperature from 2000° K. to 6000° K.

7. An MHD generator system, as recited in claim 1, wherein gaseous products of said fuel and oxidizer reaction comprise less than 1 wt/% of the gaseous mixture in said MHD generator.

8. An MHD generator system, as recited in claim 1, wherein said fuel is a pulverized metal and said fuel inlet means includes a series of openings at the end of a cylindrical first segment of said combustor, said openings located at about half the distance from the center of said cylindrical chamber cross-section to the circumference thereof.

9. An MHD generator system, as recited in claim 1, further including means for providing a metal fuel pulverized to 10 microns or less, said metal fuel selected from the group consisting of magnesium, aluminum, beryllium and zirconium.

10. An MHD generator system, as recited in claim 1, wherein said oxidizer is oxygen and said oxygen inlet means is adapted to inject the oxygen coaxially with said fuel.

11. An MHD generator system, as recited in claim 1, wherein said swirling action in said first combustor section is induced by tangential disposition of said working fluid inlet means.

12. An MHD generator system, as recited in claim 1, wherein said non-gaseous oxidation products are collected and held at a pressure corresponding to that in said first combustor section.

13. An MHD generator system, as recited in claim 1, wherein said oxidation product collection means includes heating means to prevent solidification of said by-products as they are collected and cooling means for subsequently cooling said by-products to the solidification point and comminuting said by-products to facilitate holding and removal thereof.

14. An MHD generator system, as recited in claim 1, wherein said igniter means comprises radiative heating from the inner surface of said first section of said combustor.

15. An MHD generator system, as recited in claim 14, further including means for introducing into said combustor first section, prior to any introduction of fuel, oxidizer or working fluid, a combustible fuel, burned therein in a manner adapted to heat the inner surface of the walls of said first section, and thereafter to provide said ignition means.

16. An MHD generator system, as recited in claim 1, wherein said nozzle comprises a supersonic or subsonic nozzle diverging into the channel of said MHD generator.

17. An MHD generator system, as recited in claim 1, wherein said first and second sections comprise cylindrical chambers disposed along a common axis.

18. An MHD generator system, as recited in claim 1, adapted to be operated in a gravity environment, wherein at least said first section axis is disposed vertically, said first and second inlet means being disposed near the top of said first section and said first outlet means is disposed at the bottom of said first section.

19. In an MHD generator system, as recited in claim 1, adapted to be operated in a gravity environment, wherein at least said first section is sloped downwardly from the horizontal and said first outlet means is disposed at the extreme bottom of said first section.

20. In an MHD generator system, as recited in claim 1, wherein said nozzle includes a converging entry segment, said converging entry segment including ports comprising said first outlet means.

21. An MHD generator system, as recited in claim 1, including a means for cooling the walls of said first section.

22. An MHD generator system, as recited in claim 21, wherein said cooling means comprises the non-gaseous combustion products of said fuel and said oxidizer adhered to the outer walls of said first section by centrifugal force and acting as an insulator therefor.

23. An MHD generator system, as recited in claim 21, wherein said cooling means comprises heat pipes in physical contact with the outer surface of the walls of said first section.

24. An MHD generator system, as recited in claim 1, wherein said working fluid is preliminarily heated by heat exchange with collected oxidation products removed through said first outlet means.

25. An MHD generator system, as recited in claim 9, further including means for delivering said pulverized metal fuel to said first section by dry state dense phase ga transport.

26. An MHD generator system, as recited in claim 9, further including means for delivering said pulverized metal fuel to said first section dispersed in a liquified phase consisting of hydrogen, helium, argon or oxygen.

27. An MHD generator system, as recited in claim 1, wherein said first outlet means opens into an oxidation product collection chamber containing at its upper end a plasma heat source for maintaining said oxidation products in a liquid state for easy flow and, immediately below said plasma heat source, a concentric series of inwardly facing cold gas jets consisting of a generator working fluid to freeze and shatter said oxidation products.

28. An MHD generator system, as recited in claim 1, wherein said nozzle is a supersonic nozzle and said MHD generator comprises a diverging MHD channel of disc configuration, connected in the Hall mode, whose electrode pairs are placed at the entrance and exit of the channel, and in which the gas flows radially outward under the influence of an induced Faraday electric field enclosed circumferentially and a magnetic field mutually orthogonal to the gas and Faraday field vectors.

29. An MHD generator system, as recited in claim 1, wherein said nozzle is supersonic and said generator comprises a diverging MHD generator of rectangular cross-section connected in the Faraday mode, wherein the electrode pairs are placed on the opposite facing walls having a wider separation than the remaining two walls of said rectangular channel, and said electrodes are axially segmented in a manner in which the applied magnetic field, the induced Faraday electric field and the axial gas velocity are mutually orthagonal.

30. An MHD generator system, as recited in claim 29, in which the downstream electrodes are used for powering the self-excited magnet and the upstream electrodes are used for power production.

31. A method for generation of electricity in an MHD generator under non-equilibrium conditions by supplying to said generator a working fluid comprised of alkali metal-seeded, low molecular weight gas, said method further including energizing said working fluid by intermixing said fluid with oxidation products of a magnesium, aluminum, beryllium, or zirconium fuel, said products at the working temperature and pressure of said generator being substantially non-gaseous, said method further including imparting to said mixture a swirling action and removing from said swirling mixture of said working fluid and said oxidation products, the non-gaseous by-products thereof through centrifugal action.

32. A method for generation of electricity, as recited in claim 31, wherein said fuel is magnesium, said oxidizer is oxygen and said working gas is hydrogen, wherein said magnesium is produced by electrochemical means from magnesium oxide or magnesium chloride and said hydrogen and oxygen are produced by electrolysis of water.

33. A method for generation of electricity, as recited in claim 31, wherein said fuel combustion products include liquid oxides having a vapor pressure less than one-one hundredth the working pressure of said generator.

34. A method for generating electricity, as recited in claim 31, wherein said working fluid is hydrogen and said working fluid is condensed, upon leaving said MHD generator by the contact therewith of lithium to form lithium hydride, compressing said lithium hydride, subsequently feeding said lithium hydride to reform hydrogen for re-energization and reintroduction to said MHD generator.

35. A method for generating electricity, as recited in claim 31, wherein said fuel is finely divided magnesium, aluminum, beryllium or zirconium, or combinations thereof.

* * * * *